United States Patent [19]

Medema

[11] Patent Number: 5,301,600
[45] Date of Patent: Apr. 12, 1994

[54] APPLIANCE FOR MAKING BEVERAGES

[75] Inventor: Pieter W. Medema, Groningen, Netherlands

[73] Assignee: U.S. Philips Corporation, New York, N.Y.

[21] Appl. No.: 15,722

[22] Filed: Feb. 9, 1993

[30] Foreign Application Priority Data

Feb. 12, 1992 [EP] European Pat. Off. ........ 92200383.5

[51] Int. Cl.$^5$ ............................................. A47J 31/00
[52] U.S. Cl. ......................................... 99/305; 99/306
[58] Field of Search ............. 99/295, 300, 301, 302 R, 99/304, 305, 306, 307, 316, 279; 426/433

[56] References Cited

U.S. PATENT DOCUMENTS

| 3,368,477 | 2/1968 | Raiteri | 99/305 |
| 4,056,050 | 11/1977 | Brown | 99/305 |
| 4,328,740 | 5/1982 | McDonough | 99/295 |

FOREIGN PATENT DOCUMENTS 2714736  1/1977  Fed. Rep. of Germany .

Primary Examiner—Robert W. Jenkins
Attorney, Agent, or Firm—Ernestine C. Bartlett

[57] ABSTRACT

An appliance for making beverages is provided which comprises a filter device (3) and a movable arm (7) having an outlet opening (10) for the supply of hot water to the filter device, which arm is movable by means of a motor (15) so as to position the outlet opening in different positions relative to the filter device. In order to ensure that the outlet opening (10) of the arm (7) is positioned correctly there are provided means (23b, 23c) for holding the arm, and a transmission mechanism comprising a friction coupling (20-22) is interposed between the motor (15) and the arm (7).

6 Claims, 2 Drawing Sheets

APPLIANCE FOR MAKING BEVERAGES

FIELD OF THE INVENTION

The invention relates to an appliance for making beverages, which appliance comprises a filter device and a movable arm having an outlet opening for the supply of hot water to the filter device, which arm is movable by means of a motor so as to position the outlet opening in different positions relative to the filter device, a transmission mechanism being interposed between the motor and the arm.

BACKGROUND OF THE INVENTION

Such an appliance for making beverages is known from DE-A2714 736.

In this known appliance the motor can rotate the outlet opening of the arm from one end position to another end position, the outlet opening being situated above the filter device in the one end position and the outlet opening being situated adjacent the filter device in the other end position. The last-mentioned end position is intended to feed the hot water directly, i.e. not via the filter device, into a receptacle. How the arm of the known appliance is driven by the motor is not described, except that this is effected by a timer. A problem with motors used with such drives is that when mass-produced they exhibit a substantial spread in speed tolerances. As a result of this, the position where the arm movement is stopped by stopping the motor and hence the position occupied by the outlet opening may differ considerably from one appliance to another.

SUMMARY OF THE INVENTION

An object of the invention is to guarantee that in an appliance of the type defined in the opening paragraph the outlet opening of the arm under all circumstances occupies exactly the desired position relative to the filter device.

To this end the appliance in accordance with the invention is characterized in that there are provided means for holding the arm in a position and the transmission mechanism comprises a friction coupling.

An advantage of the appliance in accordance with the invention is that as soon as the arm is retained the friction coupling becomes operative to allow the motor to stop without any subsequent movement of the arm. This means that after the arm has been stopped the motor is allowed to run on for some time without the position of the arm and hence of the outlet opening being changed thereby. This mitigates the problem of motor speed tolerances.

A preferred embodiment of the appliance is characterized in that the friction coupling comprises a friction wheel having a substantially spiral groove, which is engaged by a coupling projection connected to the arm. During operation of the motor the friction wheel rotates and the coupling projection moves in the groove. Since the groove has a spiral shape the projection is moved in a radial direction, resulting in a movement of the arm.

Another preferred embodiment of the appliance is characterized in that the means for holding the arm are constituted by the ends of the groove and the coupling projection. When during rotation of the motor the coupling projection abuts against one end of the groove the friction coupling is activated, so that the friction wheel no longer rotates. The arm then remains in the desired position relative to the filter device. The motor now has a certain run-out time to allow it to stop.

Since the groove has two ends the arm and hence the outlet opening can be positioned and stopped exactly in two positions relative to the filter device without being influenced by the run-out time of the motor. In order to enable the outlet opening to be stopped in yet another position relative to the filter device a further preferred embodiment of the device is characterized in that the spiral groove has a portion which is concentric with a spindle of the friction wheel. When the coupling projection enters this concentric portion of the groove the projection is not moved in a radial direction and the arm stops. As the movement of the projection in the concentric portion of the groove requires some time this will compensate for the time necessary to allow the motor to stop.

BRIEF DESCRIPTION OF THE DRAWINGS

An embodiment of the invention will now be described in more detail, by way of example, with reference to the drawings, in which.

DETAILED DESCRIPTION OF THE PREFERRED EMBODIMENTS

The appliance is a coffee-maker and comprises a housing 1 having a water reservoir 2 and a filter device 3. Water from the water reservoir 2 is heated in known manner by a flow heater, not shown, and is pumped to the filter device.

It is known that the taste of coffee depends inter alia on the extraction temperature, i.e. the temperature of the water in the filter device, on the contact time of the water with the ground coffee in the filter device, and on the manner in which the hot water is supplied to the ground coffee, i.e. the water distribution. A good coffee-making process starts with a uniform distribution of the water over the layer of ground coffee in order to ensure a uniform wetting of the ground coffee. The contact time between the hot water and the ground coffee should be short. This can be achieved by ensuring that the water flows only centrally onto the layer of ground coffee. When larger quantities of coffee are made the contact time is too long if all the water passes through the ground coffee. It is then better if some of the water, preferably the last part of the water being pumped, is made to bypass the filter device.

In order to meet the above-mentioned requirements the coffee-maker in accordance with the invention has the construction described hereinafter.

Figure 1:
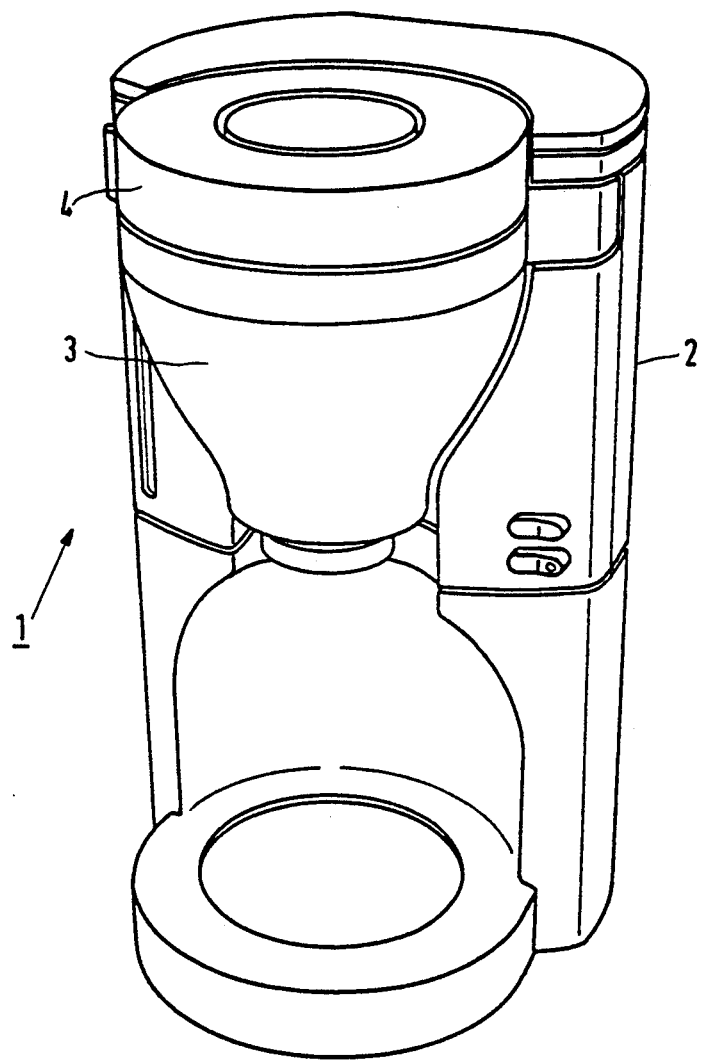
FIG. 1 is a perspective view of a coffee-maker.
Figure 2:
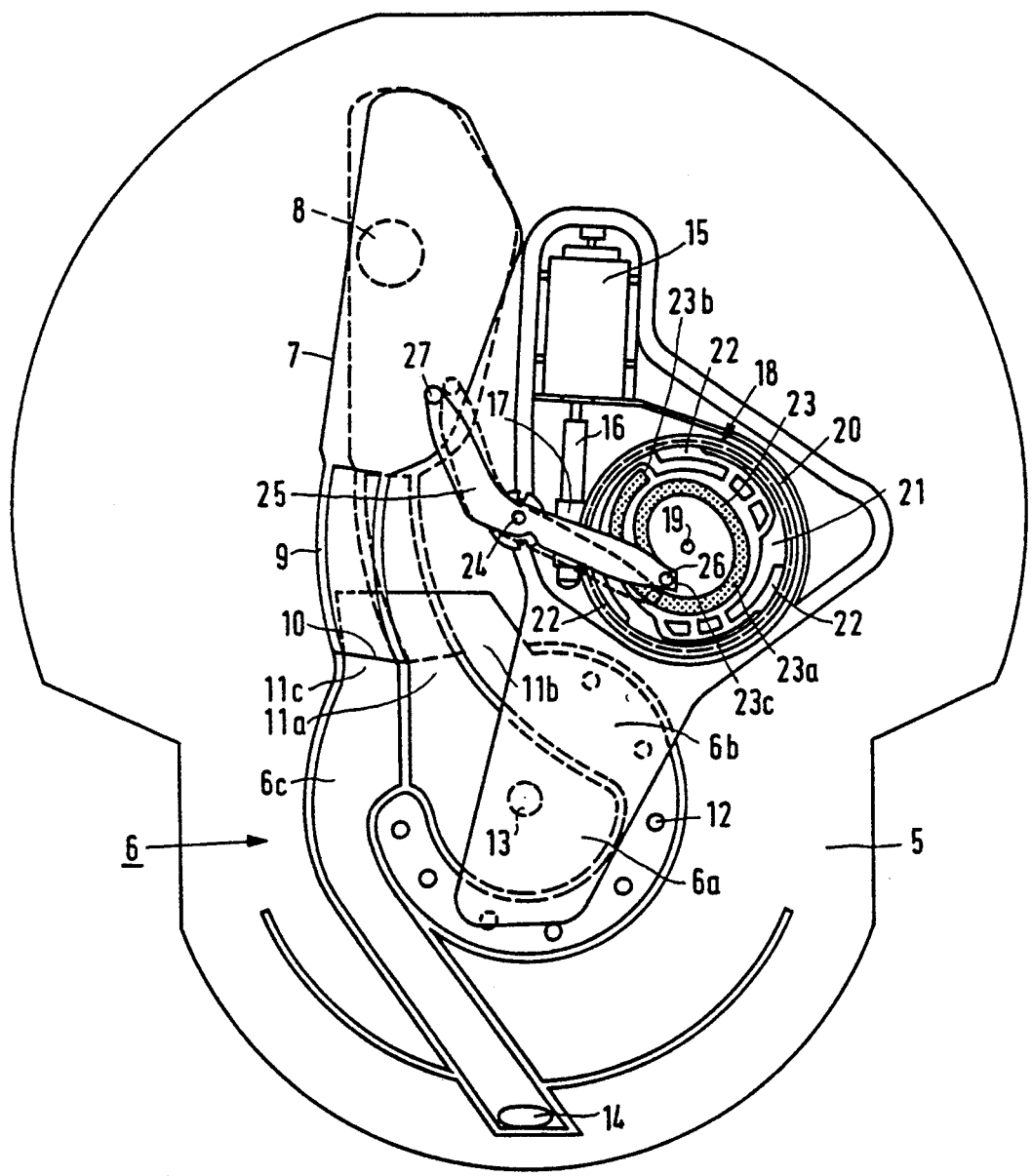
FIG. 2 shows the coffee-maker of FIG. 1 in a plan view with an upper cover removed from the appliance.

A kind of intermediate chamber 4 is arranged directly above the filter device 3. In FIG. 2 the bottom of this intermediate chamber bears the reference numeral 5. This bottom 5 has been provided with a kind of duct system 6 comprising three sections, i.e. a central section 6a, a ring-shaped section 6b surrounding the latter, and a section 6c adjacent thereto. A hollow arm 7 is arranged above the bottom 5 so as to be pivotable about an end portion of a riser pipe 8. The arm 7 has a spout 9 with an outlet opening 10. By pivoting the arm about the riser pipe 8 the outlet opening 10 can be positioned above one of the inlet openings 11a, 11b or 11c of the duct system 6. Thus, hot water from the riser pipe 8 can be conveyed from the hollow arm 7 and the spout 9 to one of the duct sections 6a, 6b or 6c.

In the first step of the coffee-making process the water is led to the partly circular duct section 6b. This section has a plurality of small holes 12 through which the water flows to the ground coffee in order to obtain a uniform wetting. In the second step the water is led to the central duct section 6a. This duct section has a central opening 13 substantially in the center above the filter bed. In this step the actual extraction takes place. In a third step, which is carried out in particular when larger amounts of coffee are to be made, the water is fed to the duct section 6c. This section has an opening 14 allowing the water to bypass the ground coffee and leading it to, for example, a coffeepot. Consequently, this water does not partake in the actual extraction process although it obviously influences the ultimately obtained degree of extraction.

The arm 7 is pivoted by means of a motor 15 in a manner to be described hereinafter. The motor shaft 16 carries a worm 17 which is in mesh with a worm wheel 18. The worm wheel 18 is rotatable about a spindle 19 and has an upright flange 20 near its outer periphery. Inside the flange a friction wheel 21 is rotatable about the same spindle 19. The friction wheel has resilient arms 22 which deflect in radially outward directions and which engage against the inner side of the flange 20. The friction wheel 21 has a substantially spiral groove 23. A lever 25 is pivotable about a spindle 24. One end of the lever has a coupling projection 26 which can slide in the groove 23. The other end of the lever carries a pin 27 by which the lever is pivotably coupled to the arm 7.

The arm 7 can be controlled by means of a control mechanism, not shown. This control mechanism causes the motor 15 to rotate anti-clockwise or clockwise at given instants, as dictated by the coffee-making process. The worm 17 on the motor shaft 16 drives the worm wheel 18, which drives the friction wheel 21 by means of the resilient arms 22. The spiral groove 23 is set into rotation and the coupling projection 26 slides through the groove and performs a movement in a radial direction relative to the spindle 19. As a result, the lever 25 performs a small pivotal movement about the spindle 24, so that the arm 7 is pivoted about the riser pipe 8. Thus, the outlet opening 10 can be positioned above one of the inlet openings 11a, 11b or 11c of the duct system 6.

In the present embodiment the outlet opening 10 can be positioned above three different inlet openings 11a, 11b and 11c. Positioning should be effected very accurately. The motors used for this purpose have a substantial spread in speed tolerances. When these motors receive a stop signal via the control mechanism the number of revolutions performed within a specific time interval differs from motor to motor.

For two of the positions of the outlet opening 10 the correct position is reached in that the coupling projection 26 abuts against the end 23b or 23c. The positions correspond respectively to those in which the outlet opening 10 faces the inlet opening 11b (wetting cycle) and in which the outlet opening 10 faces the inlet opening 11c (bypassing). The friction coupling now becomes operative, the arms 22 slipping on the inner side of the flange 20 of the worm wheel 18. The motor can now be stopped.

The third position, in which the outlet opening 10 faces the inlet opening 11a (extraction process) as indicated in broken lines, is obtained in that a central portion 23a of the groove 23 is concentric with the spindle 19. The motor should stop during the time interval in which the coupling projection 26 moves through this concentric central portion of the groove.

I claim:

1. An appliance for making beverages, which appliance comprises a filter device and a movable arm connected to a coupling projection and having an outlet opening for the supply of hot water to the filter device, which arm is movable by means of the action of a motor and said coupling projection so as to position the outlet opening in different positions relative to the filter device, a transmission mechanism comprising a frictional coupling being interposed between the motor and the coupling projection of the arm, wherein there are provided means for holding the movable arm in a position, the frictional coupling being activated during operation of the motor to engage the coupling projection to move the movable arm and being operative to allow the motor to stop without subsequent movement of the arm.

2. An appliance as claimed in claim 1, wherein the friction coupling comprises a friction wheel having a substantially spiral groove, which substantially spiral groove of the friction wheel is engaged by the coupling projection connected to the arm.

3. An appliance as claimed in claim 2, wherein the means for holding the arm are constituted by ends of the substantially spiral groove of the friction wheel and the coupling projection which is connected at one end to the movable arm and which during rotation of the motor abuts at its other end against one end of said substantially spiral groove to prevent further rotation of said friction wheel.

4. An appliance as claimed in claim 2, wherein the substantially spiral groove has a portion which is concentric with a spindle of the friction wheel.

5. An appliance for making beverages, which appliance comprises a filter device and a movable arm connected to a coupling projection and having an outlet opening for the supply of hot water to the filter device, which arm is movable by means of the action of a motor on a transmission mechanism which effects movement of said coupling projection through a substantially spiral groove so as to position the outlet opening in different positions relative to the filter device; means for holding said arm in a position; said transmission mechanism comprising a frictional coupling interposed between the motor and the coupling projection of the arm,
    wherein the frictional coupling comprises a friction wheel having said substantially spiral groove, the friction wheel being activated during operation of the motor to engage the coupling projection to move the movable arm and being operative to allow the motor to stop without subsequent movement of the arm, and
    wherein the means for holding the arm are constituted by ends of the substantially spiral groove of the friction wheel and the coupling projection which is connected at one end to the movable arm by a lever and which during rotation of the motor abuts at its other end against one end of said substantially spiral groove to prevent further rotation of said friction wheel.

6. An appliance as claimed in claim 5, wherein the substantially spiral groove has a portion which is concentric with a spindle of the friction wheel, the motor stopping when the coupling projection moves through this concentric portion of the groove.

* * * * *